United States Patent
Ikegami et al.

(10) Patent No.: US 10,555,502 B1
(45) Date of Patent: Feb. 11, 2020

(54) STUFFED TOY CONTAINING CAT ATTRACTANT MATERIAL

(71) Applicant: THE HARTZ MOUNTAIN CORPORATION, Secaucus, NJ (US)

(72) Inventors: Takeshi Ikegami, Fort Lee, NJ (US); Johann Soto, Rutherford, NJ (US)

(73) Assignee: THE HARTZ MOUNTAIN CORPORATION, Secaucus, NJ (US)

( * ) Notice: Subject to any disclaimer, the term of this patent is extended or adjusted under 35 U.S.C. 154(b) by 0 days.

(21) Appl. No.: 16/394,883

(22) Filed: Apr. 25, 2019

Related U.S. Application Data

(60) Provisional application No. 62/684,558, filed on Jun. 13, 2018.

(51) Int. Cl.
  *A01K 15/02* (2006.01)
(52) U.S. Cl.
  CPC .................. *A01K 15/025* (2013.01)
(58) Field of Classification Search
  CPC .................................. A01K 15/025
  USPC .................................. 119/711, 707
  See application file for complete search history.

(56) References Cited

U.S. PATENT DOCUMENTS

| | | | | |
|---|---|---|---|---|
| 1,031,095 A | * | 7/1912 | Smith | A01K 15/025 |
| | | | | 119/711 |
| 4,816,000 A | * | 3/1989 | Hsu | A63H 3/005 |
| | | | | 206/457 |
| 4,928,632 A | * | 5/1990 | Gordon | A01K 15/025 |
| | | | | 119/709 |
| 5,682,838 A | * | 11/1997 | Reich | A01K 15/025 |
| | | | | 119/709 |
| 6,023,822 A | * | 2/2000 | Luebke | A61G 17/08 |
| | | | | 27/1 |
| 6,048,248 A | * | 4/2000 | Ritchey | A63H 3/003 |
| | | | | 446/369 |
| 6,089,947 A | * | 7/2000 | Green | A63H 3/003 |
| | | | | 119/711 |
| 6,824,112 B2 | * | 11/2004 | Lange | A61J 9/0607 |
| | | | | 248/102 |
| 6,840,197 B1 | * | 1/2005 | Trompke | A01K 15/02 |
| | | | | 119/711 |
| 8,011,326 B2 | | 9/2011 | del Pinal et al. | |
| 8,960,130 B2 | * | 2/2015 | Willinger | A01K 15/026 |
| | | | | 119/707 |
| 2005/0075034 A1 | * | 4/2005 | Ritchey | A01K 15/025 |
| | | | | 446/71 |

(Continued)

OTHER PUBLICATIONS

Chewy.com. (Available for sale at least as early as Nov. 1, 2017, based on customer reviews). Petlinks HyperNip Love Birds Catnip Cat Toys, 2 count. Retrieved from chewy.com/petlinks-hypernip-love-birds-catnip/dp/164468.

*Primary Examiner* — Magdalena Topolski
(74) *Attorney, Agent, or Firm* — Gottlieb, Rackman & Reisman, P.C.

(57) ABSTRACT

A stuffed toy includes a body and a head connected to the body, the body and the head together defining an internal space and forming an exterior of the stuffed toy. The stuffed toy includes a container at least partially filled with a cat attractant material which emits an aroma. The container is disposed within the internal space of the stuffed toy and has an opening in a portion of the internal space corresponding to the head such that the emitted aroma is greater at the head of the stuffed toy as compared to along the body.

22 Claims, 12 Drawing Sheets

(56) References Cited

U.S. PATENT DOCUMENTS

| | | | |
|---|---|---|---|
| 2005/0101220 A1* | 5/2005 | Jackson | A61F 7/02 446/369 |
| 2006/0137624 A1* | 6/2006 | Lamstein | A01K 15/025 119/711 |
| 2006/0205319 A1* | 9/2006 | Colvin | A63H 3/005 446/369 |
| 2008/0032592 A1* | 2/2008 | Korbonski | A47G 9/1045 446/297 |
| 2009/0084325 A1* | 4/2009 | Moskoff | A01K 15/025 119/707 |
| 2010/0147229 A1* | 6/2010 | DeFazio | A01K 15/025 119/710 |
| 2012/0085294 A1* | 4/2012 | Christianson | A01K 15/025 119/707 |
| 2014/0053786 A1 | 2/2014 | Lee | |
| 2016/0029597 A1* | 2/2016 | Gratza | A01K 15/025 119/707 |
| 2018/0242550 A1* | 8/2018 | Rogers | A01N 25/08 |
| 2019/0254257 A1* | 8/2019 | Alm | A01K 15/025 |

* cited by examiner

STUFFED TOY CONTAINING CAT ATTRACTANT MATERIAL

This application is based on and claims priority from U.S. Provisional application No. 62/684,558 filed on Jun. 13, 2018.

BACKGROUND OF THE INVENTION

Stuffed toys are designed for a variety of uses. For example, children and pets play with stuffed animals, dolls, balls, and other stuffed toys having innumerable shapes and sizes.

There are numerous stuffed toy products available in the marketplace that are designed for use by a wide variety of domestic animals including cats. Cat toys including those containing a cat attractant material such as catnip abound. Such toys stimulate cat play because of the minty fragrance of the catnip. As can be appreciated, there are a number of design considerations for such toys, in part due to the need for the delivery of the visceral effects of the cat attractant material while offering a safe and convenient product.

Catnip or Nepatia cataria is a plant native to parts of Europe, the Middle East, and some parts of Asia, and has been introduced to North America. The dried leaves of the catnip plant have a mint-like scent as mentioned above. It is known that catnip has a hallucinogenic effect upon cats. Such a response is due to the plant's active ingredient, nepetalacetone. When a cat smells catnip, it exhibits a range of behaviors. Most reactions last from five to fifteen minutes and include sniffing, licking and chewing, chin and cheek rubbing, and head-over roll and body rubbing.

Accordingly, it would be desirable to provide a stuffed toy which promotes interaction between a pet owner and a cat.

SUMMARY OF THE INVENTION

Generally speaking, in accordance with the invention, a toy product for cats is provided. The toy is typically a plush toy having a body and a head which together define an internal opening therewithin. A container, for example a bag or wrap made of a non-permeable or slightly permeable membrane material is provided and contains a cat attractant material. The container is disposed within the internal opening of the toy and is open in the area of the toy's head or near the toy's head. As a result, the cat attractant material will emit an aroma that is substantially greater at the head of the toy as compared to the rest of the toy body. This will facilitate the cat's playfulness while also providing a pleasing presentation to the cat owner and other viewers as the cat will likely hug the toy along its head and kick back its legs.

Preferably, the toy product is a plush toy in the shape of an animal with the head decorated to have the appearance of a particular animal's head. The plush toy would be filled with fabric fibers and the container is at least partially filled with catnip or with a combination of catnip, silver vine and/or other cat attractants. The catnip may be disposed in the bag or wrap while the silver vine is retained porous encapsulating units which may be disposed in the bag or wrap and/or outside of the bag or wrap within the toy's head.

In an embodiment, a plush toy includes a body and a head connected to the body, the body and the head together defining an internal space and forming an exterior of the stuffed toy. A container, at least partially filled with a cat attractant material which emits an aroma, is disposed within the internal space of the stuffed toy.

The container includes a first opening in a portion of the internal space corresponding to the head, in a portion of the internal space corresponding to a boundary between the body and the head, or in a portion of the internal space corresponding to the body but at a vicinity of the head such that the emitted aroma is greater at the head of the stuffed toy as compared to along the body.

It is an object of the invention to provide an improved cat toy.

It is another object of the invention to provide a toy that promotes cat playfulness.

It is a further object of the invention to provide a cat toy that creates a visually pleasing experience for the cat owner.

Still other objects of the invention will be apparent from the following description.

BRIEF DESCRIPTION OF THE DRAWINGS

For a fuller understanding of the invention, reference is made to the following description taken in connection with the accompanying drawings, in which.

DETAILED DESCRIPTION OF THE EMBODIMENTS

Figure 1A:
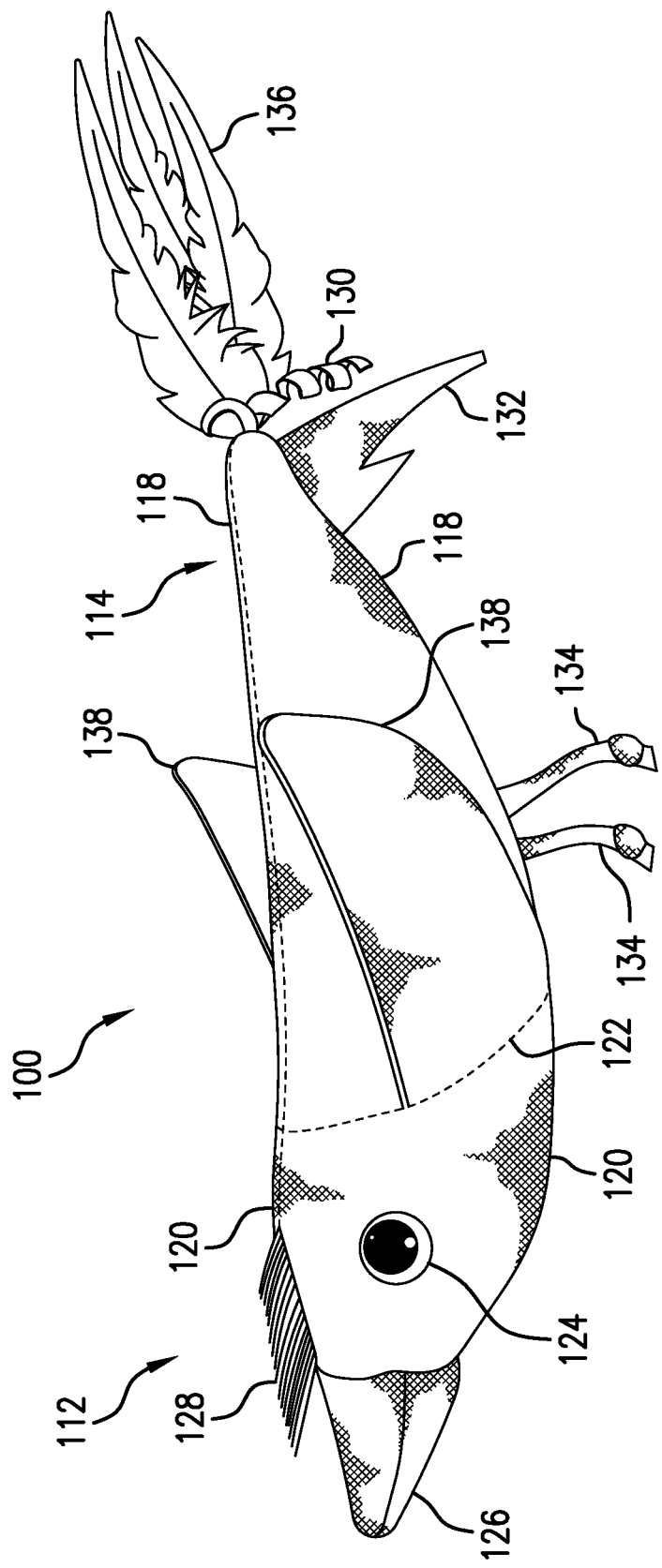
FIG. 1A is a perspective view illustrating a stuffed toy according to an exemplary embodiment of the present invention.

Exemplary embodiments of the present invention will be described more fully hereinafter with reference to the accompanying drawings. The present invention may, however, be embodied in different forms and should not be construed as limited to the embodiments set forth herein. Like reference numerals may refer to like elements throughout the specification. The sizes or proportions of elements illustrated in the drawings may be exaggerated for clarity. When an element is described to be connected or attached to another element, intervening elements may be attached/connected therebetween unless the context clearly indicated otherwise.

The invention is directed to a stuffed toy with which a cat can play. The stuffed toy has a head portion and an elongated body portion configured to resemble a particular animal, for example, a bird, a fish, a sea horse or other animal. Alternatively, or in addition, stuffed toy can be configured to resemble a fictional creature, for example, a unicorn. A container, for example, a bag or a wrap, is disposed inside of the stuffed toy. The container is filled at least partially with cat attractants, for example, catnip, silver vine, valerian root, tatarian honeysuckle, and the like. The container has an opening inside of the head portion or at a location within the toy's body near the head portion to release scent/vapors through the toy's head.

As a result, the cat will receive an intense aroma at the head of the stuffed toy. Therefore, when a cat plays with the stuffed toy according to the present invention, it will likely hug the toy along its head and typically kick back its legs, which is visually pleasing to the cat owner.

FIGS. 1A-1F illustrate a stuffed toy 100 according to an exemplary embodiment of the present invention.

Figure 1B:
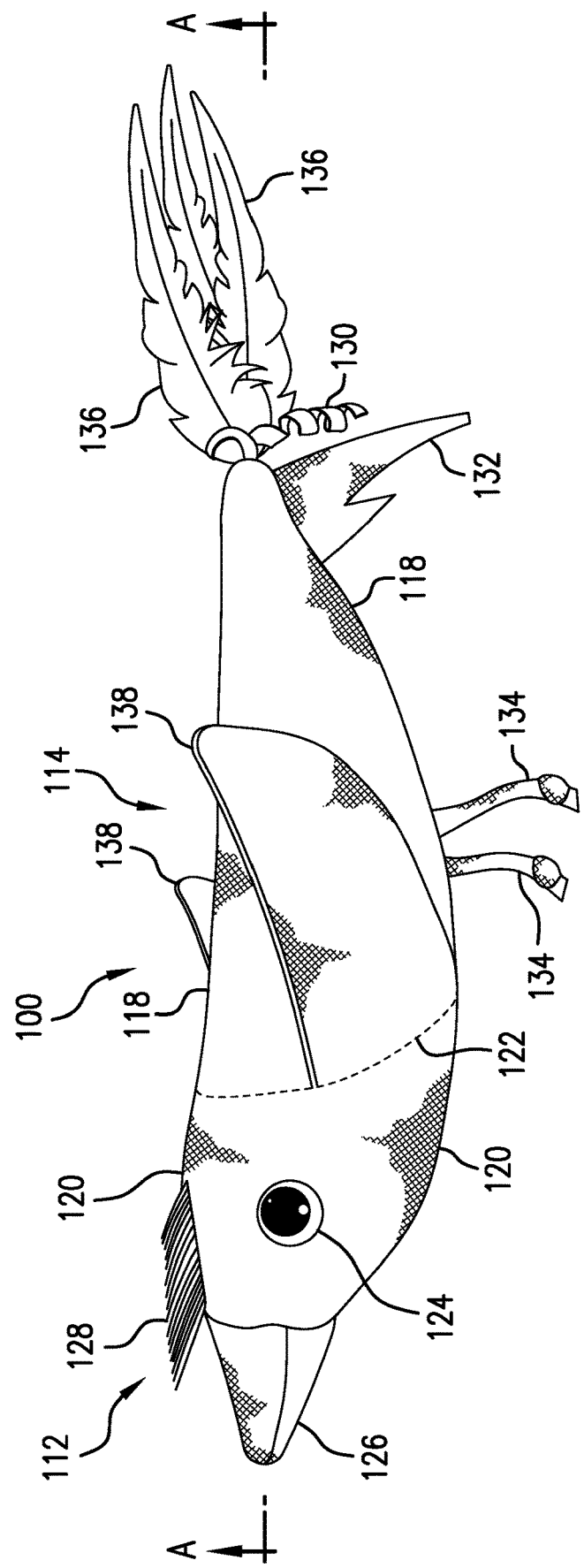
FIG. 1B is a side elevational view illustrating a side of the stuffed toy of FIG. 1A according to an exemplary embodiment of the present invention.

Referring to FIGS. 1A-1B, the stuffed toy 100 is a plush toy bird, but a stuffed toy according to the present invention may also resemble other animals, for example land animals and aquatic animals. In addition, a stuffed toy may be configured to resemble a fictional creature, for example, a unicorn.

Figure 1C:
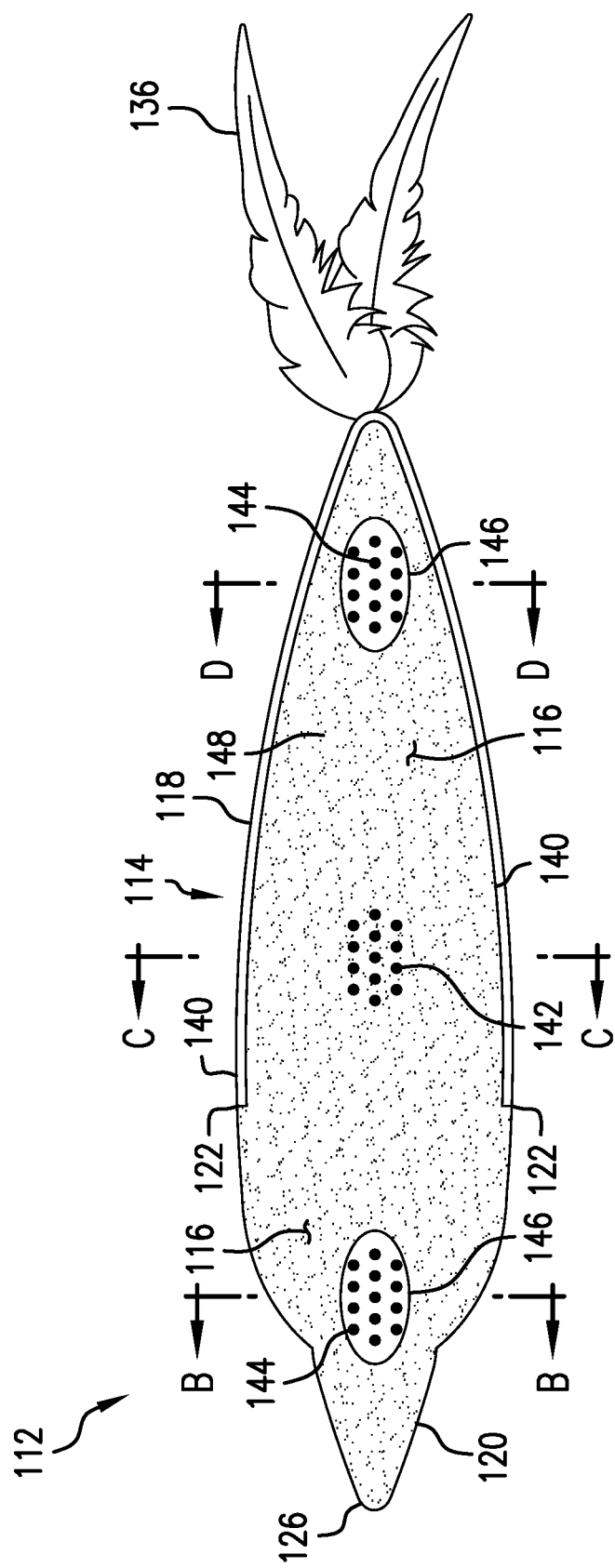
FIG. 1C is a cross-sectional view taken along line A-A of FIG. 1B.

Referring again to FIGS. 1A-1B, the stuffed toy 100 includes a body portion 114 and a head portion 112 connected to the body portion 114. Referring to FIG. 1C, the body portion 114 and the head portion 112 together define an interior space 116. The "interior space" 116 may also be referred to as an "internal space" 116.

Referring to FIGS. 1A-1C, the body portion 114 includes an exterior 118, and the head portion 112 includes an exterior 120.

The exterior 118 of the body portion 114 may include a fabric material, for example, canvass fabric. The canvass fabric may be made of, for example, cotton, flax, hemp, and/or other yarn. However, the exterior 118 is not limited to a fabric having a canvass structure, and may also include a fabric having a plain sheet structure, fabric with perforations, etc. Such fabric made be made of cotton, flax, hemp, etc. In addition, or alternatively, the exterior 118 may include nylon fabric, polyester fabric, wool fabric, etc. The fabrics included in the exteriors 118 and 120 may be woven or knit. Alternatively, or in addition, the exteriors 118 and 120 may include a fabric that is neither woven nor knit, for example, felt. The exterior 118 may be configured to be permeable to air to allow air to pass therethrough or may be configured to substantially block air from passing therethrough.

The exterior 120 of the head portion 112 may include the same fabric materials as the exterior 118. Thus, a detailed description thereof will be omitted herein for brevity purposes. As will be described below, cat attractant material is included in the interior space 116 of the stuffed toy 100, and the stuffed toy 100 is configured to release the scent of the cat attractant material mainly through the head portion 112. Thus, at least a portion of the exterior 120 includes a fabric that is permeable to air to release the scent of the cat attractant material therethrough. In an embodiment, the entire exterior 120 of the head portion 112 is permeable to air such that the cat attractant scent can be released therethrough.

As shown in FIGS. 1A-1C, the head and body portions 112 and 114 may be made of separate fabrics joined to each other by a seam 122. However, the present invention is not limited thereto. For example, the head and body portions 112 and 114 may also be formed of a continuous fabric material.

With reference to FIGS. 1A-1F, the body portion 114 may have an elongated shape. For example, the body portion 114 may have a roughly columnar shape and may extend in a curved fashion as shown in FIGS. 1A-1B. As shown in FIGS. 1A to 1C, the body portion 114 may become gradually smaller toward a tail end of the stuffed toy 100.

Figure 1D:
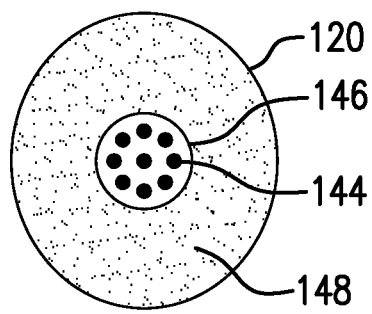
FIG. 1D is a cross-sectional view taken along line B-B of FIG. 1C.
Figure 1E:
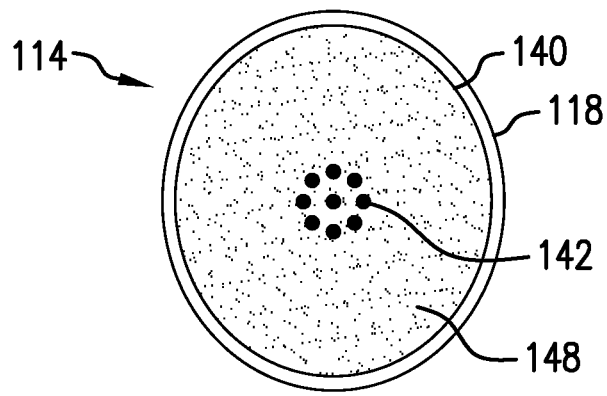
FIG. 1E is a cross-sectional view taken along line C-C of FIG. 1C.
Figure 1F:
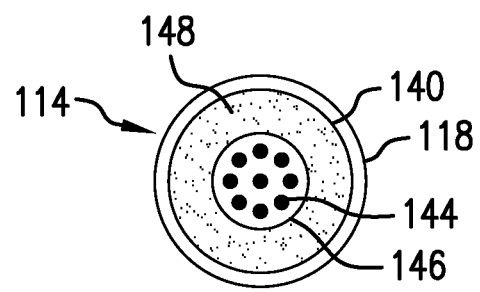
FIG. 1F is a cross-sectional view taken along line D-D of FIG. 1C.

Referring to FIGS. 1D-1F, the body portion 114 is shown as being round or substantially round in cross-section, but the present invention is not limited thereto. For example, the body portion 114 may have an elliptical, oval, or other cross-section, or a cross-section having curved portions or a combination of curved and flat portions.

Referring to FIGS. 1A-1B, the head portion 112 is configured to resemble the head of a bird and may include eyes 124 stitched thereon, a beak 126 attached at a front end of the stuffed toy 100, a crown or crest 128 and other decorative attachments as desired. Such features included in the head portion 112 are visually pleasing and may aid a cat in identifying the head portion 112 as being the head of the stuffed toy 100.

Referring to FIG. 1D, the head portion 112 is shown to have a quasi-elliptic shape in cross-section, but the present invention is not limited thereto, and the head portion 112 may have a round, oval or other cross-section, or a cross-section having curved portions or a combination of curved and flat portions.

Although not shown in the drawings, the exterior 120 and the exterior 118 can be decorated with color to provide an aesthetically pleasing plush toy. For example, the exterior 120 and the exterior 118 can be colored as desired, and may have the same color as one another or different colors. In addition, the exteriors 120 and 114 may each have various coloring patterns/schemes as desired.

Referring again to FIGS. 1A-1B, the body portion 114 may include at least one cord 130, a crest-like attachment 132, a plurality of strings 134 and a plurality of feathers 136 for decorative purposes. The strings 134 may imitate the toy bird's legs. The feathers 136 may be disposed at the tail end of the stuffed toy 100 to resemble the tail feathers of a bird and/or for decorative purposes. In an embodiment, the feathers 136 are genuine feathers to attract the cat and to visually please the cat owner. The feathers 136 may all have the same color as each other or may have different colors.

Referring to FIGS. 1A-1B, the stuffed toy 100 may include a pair of wings 138. The wings 138 may be attached at any portion along the exterior 118 or may be attached to the exterior 120 of the head portion 112. In an embodiment, as shown in FIG. 1A, the wings 138 are attached at the seam 122 to facilitate the construction of the stuffed toy 100. In FIG. 1C, the wings 138 are not displayed for clarity purposes.

The wings 138 may include a material that makes crinkle-like sounds when manipulated (e.g., touched, pushed, bent, folded, rolled) to attract a cat and to encourage and/or extend an interaction between the cat, the stuffed toy 100 and/or the cat owner. For example, the wings 138 may include a cellophane sheet, a high-density polyethylene (HDPE) sheet, or other sheet material that makes crinkle-like sounds when manipulated. Although not shown in the drawings, the wings 138 may have a polka dot pattern formed thereon, and the round dots may be highly reflective, shiny and/or sparkling to attract a cat.

Thus, the exterior of the stuffed toy 100 is configured to attract a cat and to keep the cat interested in playing with the stuffed toy 100.

Referring to FIGS. 1C, 1E and 1F, the interior space 116 may include a container 140 disposed therein. The container 140 may be a bag or a wrap. The container 140 is filled at least partially with cat attractant material. The cat attractant material may be, for example, catnip, silver vine, valerian root, tatarian honeysuckle, and the like. In an embodiment, with reference to FIGS. 1C, 1E and 1F, the container 140 includes catnip 142 and silver vine 144. It is understood that the container 140 may include more than two different types of cat attractant material or a single type of cat attract material.

Referring to FIG. 1C, the catnip 142 may be disposed near or adjacent to an opening of the container 140 (e.g., near or adjacent to the seam 122). However, the present invention is not limited thereto, and the catnip 142 may be disposed at other portions of the container 140 and/or may be dispersed throughout the container 140.

As shown in FIGS. 1C, 1D and 1F, the silver vine 144 may be provided in powder form and may be retained in permeable containers 146. The containers 146 may be, for example, cotton bags. Thus, the scent of the silver vine 144 can be emitted out of the containers 146. In FIG. 1C, the container 140 is shown to include one silver vine container 146, but the present invention is not limited thereto. For example, the container 140 may include a plurality of containers 146, each of which containing silver vine 144 inside. In addition, one of the containers 146 is shown in FIG. 1C to be disposed near the tail end of the stuffed toy 100, but this is merely exemplary. The container(s) 146 may be disposed at any location within the interior of the container 140, as desired.

As shown in FIGS. 1C and 1D, a container 146 including silver vine 144 may also be disposed at a portion of the interior space 116 corresponding to the head portion 112, outside of the container 140. In addition, a plurality of containers 146 with silver vine 144 therein may be disposed in the portion of the interior space 116 that corresponds to the head portion 112. In an embodiment, at least one container 146 is disposed inside of the container 140 and no container 146 is disposed outside of the container 140.

It is understood that other cat attractants can be disposed in the portion of the interior space 116 that corresponds to the head portion 112. This would include catnip 142, valerian root, tatarian honeysuckle, etc.

FIGS. 1D-1F illustrate the catnip 142 and silver vine 144 as being disposed approximately in the center of the stuffed toy 100. However, this arrangement is merely exemplary, and the catnip 142, silver vine 144 and other cat attractants included in the stuffed toy 100 may be disposed anywhere in the interior space 116 or anywhere inside the container 140.

The interior space 116, including an interior area of the container 140 not filled by the cat attractant(s), may be filled with a filler material 148, indicated by the stippling in FIGS. 1C-1F. The filler material 148 may be permeable to air to release the scents of the cat attractant(s) included in the interior space 116 of the stuffed toy 100. The filler material 148 may include for example, polyester fibers or other stuffing material well known in the art which is permeable to air and which may be soft, fluffy and resilient.

In an embodiment, although not shown in the figures, the toy 100 includes a mixture of catnip 142 and silver vine 144 disposed on at least one location along the interior space 116. In this embodiment, the catnip 142 and the silver vine 144 may be mixed together in a form of, for example, a ball, or a clump of material, or may be provided as loose material in, for example, powder form or as ground/chopped, sliced material, In this embodiment, the mixture of catnip 142 and silver vine 144, whether in the form of a ball, clump, loose material, or the like, may be disposed at a plurality of locations within the interior space 116. For example, a first ball/clump or mixture of loose material containing catnip 142 and silver vine 144 may be disposed within the head portion 112, and a second ball/clump or mixture of loose material containing catnip 142 and silver vine 144 may be disposed within the container 140. The second ball/clump or mixture of loose material containing catnip 142 and silver vine 144 may be disposed near, or at the tail end of the container 140 (inside of the container 140), or at other locations inside of the container 140. It is understood that more than 2 balls, clumps or loose mixtures of catnip 142 and silver vine 144 may be disposed inside of the interior space 116. In addition, more than 1 ball, clump or loose mixture of catnip 142 and silver vine 144 may be disposed inside of the container 140, and that more than 1 ball, clump or loose mixture of catnip 142 and silver vine 144 may be disposed outside of the container 140 (e.g., inside of the head portion 112 but outside of the container 140). Further, each of the mixtures of catnip 142 material and silver vine 144 may be encapsulated inside of a porous capsule, or the porous capsule may be omitted.

Referring to FIGS. 1C-1F, the container 140 may extend at least partially along a portion of the interior space 116 corresponding to the body portion 114. The container 140 may also extend along the entire portion of interior space 116 that corresponds to the body portion 114, as shown in FIG. 1C. However, although not shown in the drawings, the container 140 may also extend in a portion of the interior space 116 that corresponds to the head portion 112.

In FIG. 1C it is exemplarily illustrated that the container 140 may extend all the way to the tail end of the toy 100, but the present invention is not limited thereto. For example, although not shown in the drawings, the container 140 may also extend, from about an area where the head and body portions 112 and 114 meet, in a direction toward the tail end of the toy 100, but not all the way to the tail end of the toy 100. When the container 140 does not extend all the way to the tail end of the toy 100, a separating gap is formed between the tail end of the toy 100 and the container 140. The separating gap leaves room for seaming the fabric components/panels that make up the exterior 118 to one another. Thus, the separating gap facilitates the process of building the toy 100. In addition, the separating gap makes room for, and thus facilitates, the attachment of the feathers 136 and/or other decorative attachments to the tail end of the toy 100 when the toy 100 is being constructed. When the container 140 does not extend all the way to the tail end of the toy 100, an end portion of the container 140 that is adjacent to the tail end of the toy 100 may be open or closed. Even when the end portion of the container 140 that is adjacent to the tail end of the toy 100 is open, the opening of the container 140 located adjacent to the tail end of the toy 100 may be smaller than the opening of the container 140 located adjacent to the head portion 112 such that most of the vapor/scent of the cat attractant(s) included inside of the container 140 is mainly released through the head portion 112.

The container 140 may be made of, for example, cellophane, polyester, polypropylene, nylon, or other film, sheet, or fabric of flexible plastic materials. In addition, the container 140 may have a crinkle-like construction. Thus, the container 140 will produce a sound that is pleasing to a cat when the cat is playing with stuffed toy 100.

The container 140 may be non-permeable to air such that the vapor/scent of the cat attractant(s) included therein, for example, the catnip 142, the silver vine 144, etc., is released through the opening(s) of the container 140. Alternatively, the container 140 may be configured to have a low permeability such that the vapor/scent of the cat attractant(s) included therein is released mainly through the opening(s) of the container 140, and a small portion (e.g., about 0% to about 5%, or about 0% to about 10%) of the cat attractant(s) vapor/scent is released through a body of the container 140. In this case, the container 140 may have perforations or may be made of a suitable sheet material or fabric material that releases only a small portion of the cat attractant(s) scent throughout its body.

However, it is understood that whether non-permeable or slightly permeable, the container 140 is configured to release the cat attractant(s) scent/vapor mainly through its opening adjacent to the head portion 112. Thus, the non-permeable or low-permeability structure of the container 140 acts as a vapor barrier and also helps preserve the cat attractant material that is housed therein.

Although not shown in the drawings, the container 140 may be stitched to the body portion 114 and/or the head portion 112. Alternatively, or in addition, the container 140 may be laminated to the body portion 114 and/or the head portion 112.

Referring to FIG. 1C, when the container 140 has only one opening, the opening of the container 140 may be disposed at a location approximately where the head and body portions 112 and 114 meet, for example, adjacent to the seam 122 (see FIG. 1B). Thus, the vapor/scent of the catnip 142, silver vine 144, valerian root, tatarian honeysuckle, and/or other cat attractants that may be disposed inside the container 140 is released mainly through the head portion 112 of the stuffed toy 100.

Figure 2A:
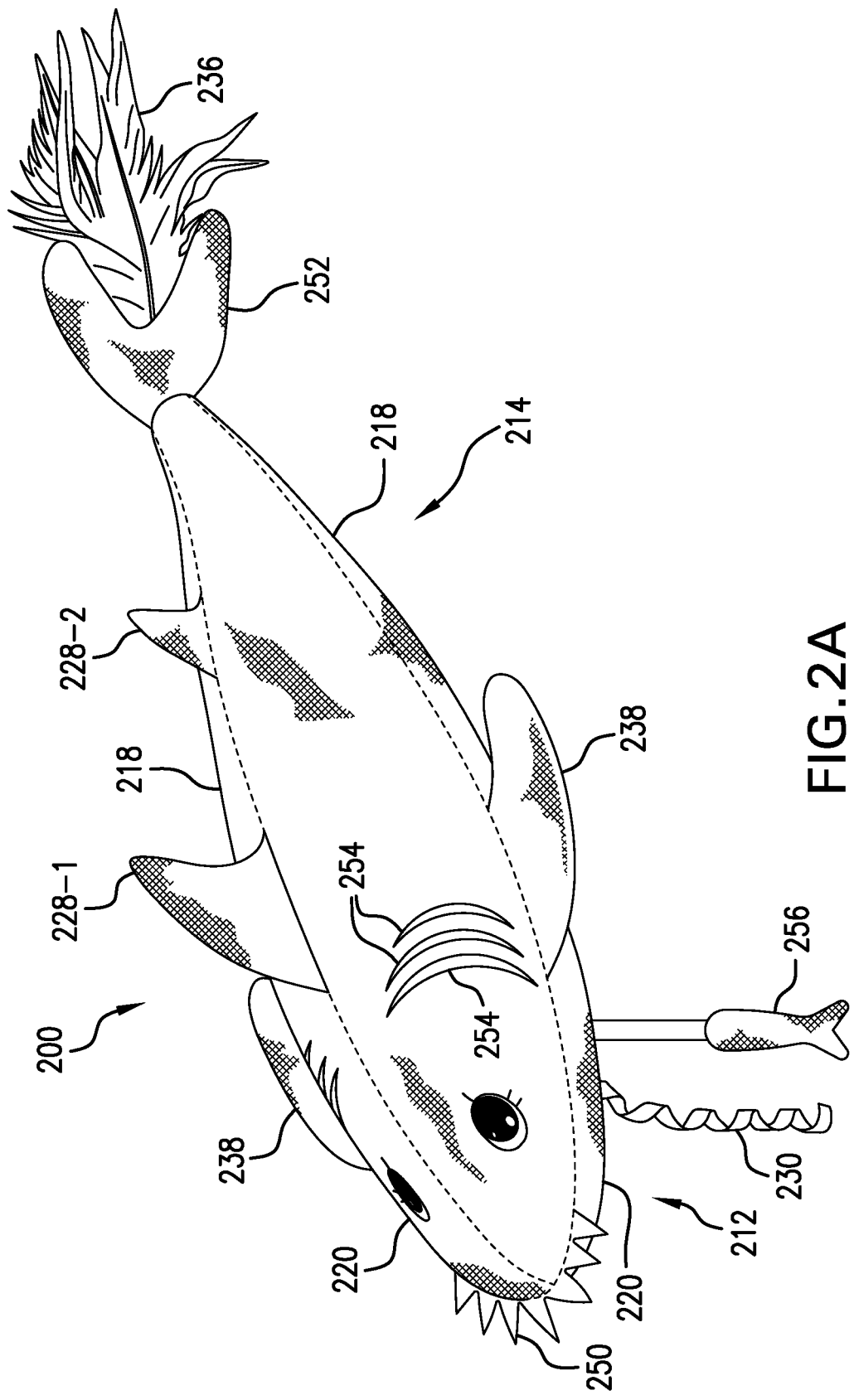
FIG. 2A is a perspective view illustrating a stuffed toy according to an exemplary embodiment of the present invention.
Figure 2B:
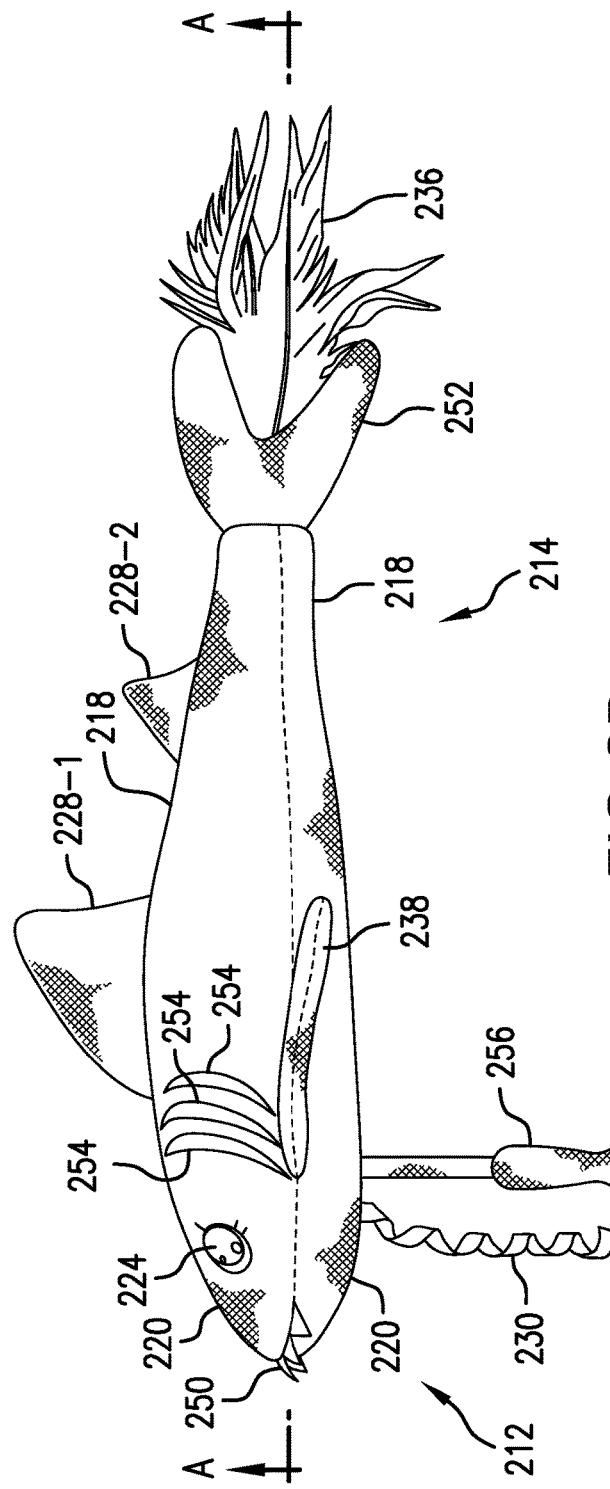
FIG. 2B is a side elevational view illustrating a side of the stuffed toy of FIG. 2A according to an exemplary embodiment of the present invention.
Figure 2C:
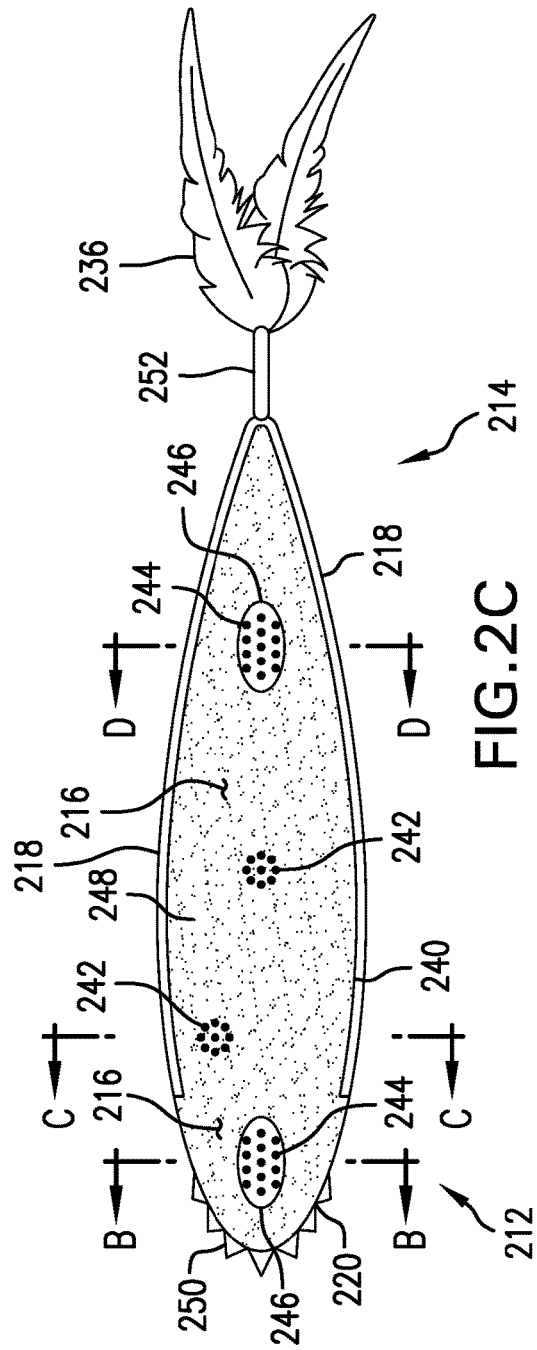
FIG. 2C is a cross-sectional view taken along line A-A of FIG. 2B.
Figure 2D:
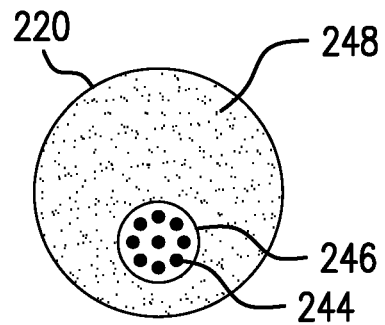
FIG. 2D is a cross-sectional view taken along line B-B of FIG. 2C.
Figure 2E:
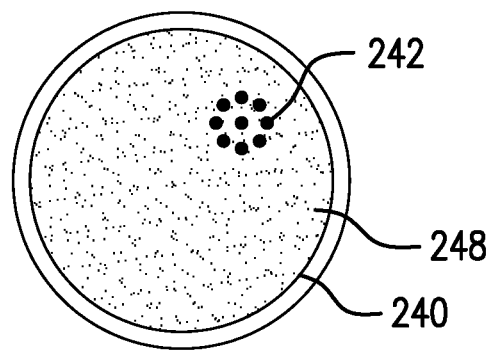
FIG. 2E is a cross-sectional view taken along line C-C of FIG. 2C.
Figure 2F:
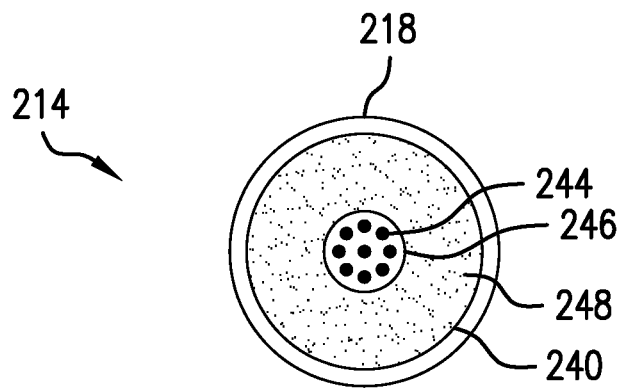
FIG. 2F is a cross-sectional view taken along line D-D of FIG. 2C.
Figure 2G:
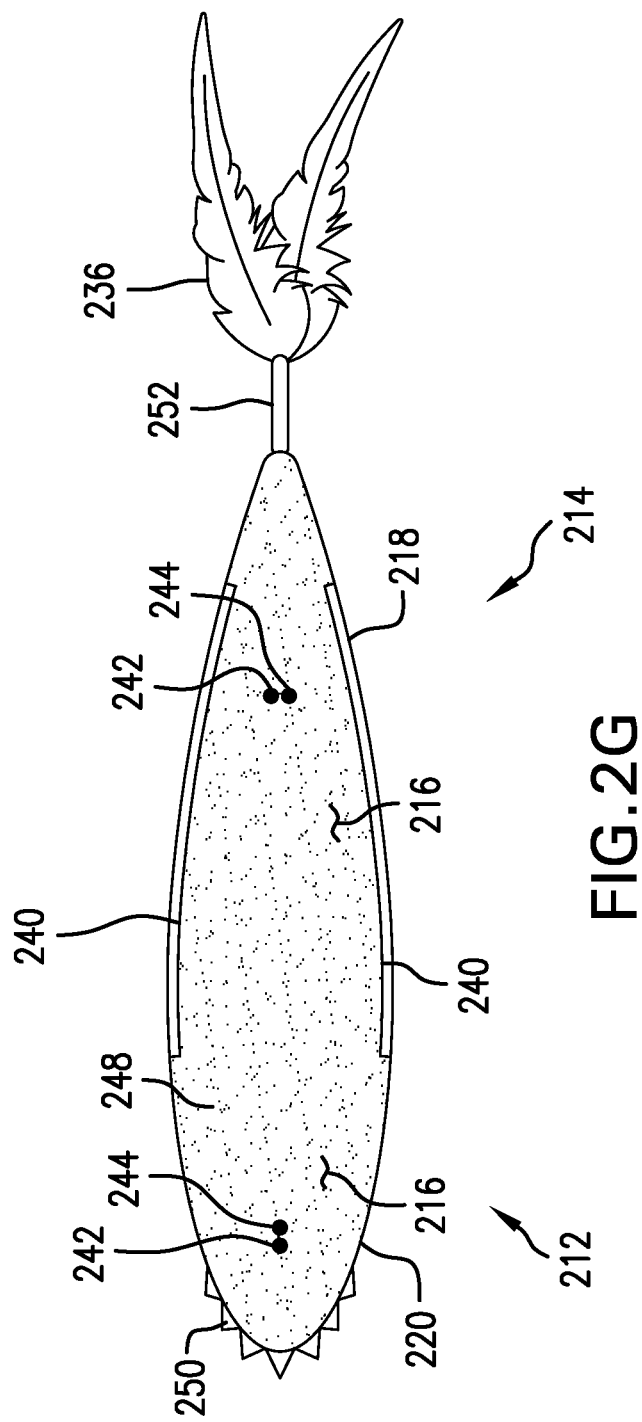
FIG. 2G is a cross-sectional view taken along line A-A of FIG. 2B according to an alternate embodiment.

As shown in FIG. 2G, when the container 140 has two openings, for example, one opening where the head and body portions 112 and 114 meet and another opening adjacent to the tail end of the toy 100, the opening located where the head and body portions 112 and 114 meet may be larger than the opening adjacent to the tail end of the toy 100 such that most of the vapor/scent of the cat attractant(s) included inside of the container 140 is mainly released through the head portion 112.

Although not shown in the drawings, the container 140 may also extend partially within the interior space 116 that corresponds to the head portion 112. In this case, the container 140 may also include an opening within the head portion 112 such that the aroma of the catnip 142, silver vine 144, valerian root, tatarian honeysuckle, and/or other cat attractants that may be disposed inside the container 140 is released mainly through the head portion 112 of the stuffed toy 100.

Although not shown in the drawings, whether the container 140 has one or more openings, the opening of the container 140 that is proximate to the head portion 112 may be disposed slightly rearwardly of where the head and body portions 112 and 114 meet or slightly forwardly of where the head and body portions 112 and 114 meet. Thus, whether the opening of the container 140 that is proximate to the head portion 112 is located slightly forwardly or slightly rearwardly of where the head and body portions 112 and 114 meet, the opening will be located sufficiently close to the head portion 112 such that the aroma of the catnip 142, silver vine 144, valerian root, tatarian honeysuckle and/or other cat attractants disposed inside the container 140 will be released mainly through the head portion 112 of the stuffed toy 100.

Although the container 140 is described as having either one or two openings, it is understood that the container 140 may also more than two openings. However, the number of openings, and their respective sizes and locations on the container 140 need to be configured in such a way that the aroma of the catnip 142, silver vine 144, valerian root, tatarian honeysuckle and/or other cat attractants disposed inside the container 140 will be released mainly through the head portion 112 of the stuffed toy 100.

As a result, a cat smelling the head portion 112 of the stuffed toy 100 will likely exhibit a range of behaviors, for example, hugging the stuffed toy 100, body rubbing, sniffing, licking and chewing, chin and cheek rubbing, and head-over roll and other behaviors which please the pet owner and promote interaction between the cat and the pet owner.

The stuffed toy 100 may be about 8 to about 16 inches long and about 2 to about 5 inches wide. Thus, since aroma of the cat attractants disposed inside of the container 140 is released mainly through the head portion 112 of the stuffed toy 100, and since the stuffed toy 100 is shaped and sized to be hugged by a cat, the cat is likely to hug the stuffed toy 100 such that the head portion 112 of the stuffed toy 100 and the head of the cat are arranged next or adjacent to each other, and the body of the cat may extend and may be in contact with the body portion 114 of the stuffed toy 100. In addition, the cat may kick its hind legs against the body portion 114 and rub its head against the head portion 112. Accordingly, the stuffed toy 100 of the present invention promotes interaction between a cat, a stuffed toy and/or the cat's owner.

Since additional cat attractant(s) may be disposed outside of the container 140, such as the silver vine 144 that may be disposed inside of the head portion 112, as shown in FIGS. 1C-1D, the aroma of the cat attractant(s) released through the head portion 112 may be strong. Thus, the lifespan of the stuffed toy of the invention may be long.

In addition, since the interior space 116 corresponding to the head portion 112 may include a different cat attractant than that included in the container 140, the efficacy of the mind-altering effect of the stuffed toy 100 on the pet is high. Thus, even when one of the cat attractants included in the interior space 116 has a low efficacy on a particular cat, the stuffed toy 100 can be effective in altering the behavior of cat pet, as described above, due to the efficacy of the other cat attractant(s) included therein.

In addition, the stuffed toy 100 is safe for pets since the cat attractant material is disposed inside of it. Thus, since a cat does not have access to the cat attractant material inside the stuffed toy 100, the stuffed toy 100 may prevent the ill effects such as vomiting, sickness, tiredness, or a display of other unhealthy and/or undesirable behavior resulting from the pet ingesting cat attractant(s). In addition, the stuffed toy 100 does away with the need to pour cat attractant material on the owner's hand and/or spilling the cat attractant material on the floor in an attempt to alter the behavior of a cat. Thus, there is no need to clean up after using the stuffed toy 100 as there is when using loose cat attractant material.

Thus, the stuffed toy 100 is a safe, clean and aesthetically pleasing product that can be used to induce a cat into exhibiting a range of desirable behaviors and to interact with its owner and/or the stuffed toy 100 repeatedly over a long period of time.

Although not shown in FIGS. 1A-1F, in an embodiment, the container 140 may be disposed entirely inside of the head portion 112, or a major portion of the container 140 may extend inside of the head portion 112. In this case, the opening of the container 140 may be included in a part of the interior space 116 corresponding to the head portion 112, or in a part of the interior space 116 corresponding to the body portion 114 but in a vicinity of the head portion 112. In this embodiment, the exterior 118 may be made of a non-permeable or slightly permeable fabric material, sheet material or film and/or the interior surface/walls of the body portion 114 may be lined with a non-permeable or slightly permeable fabric material, sheet material or film such that the vapor of the cat attractant material inside of the stuffed toy 100 is released mainly though the head portion 112. In this case, the container 140 may be sewn to or laminated on a portion of the interior surface/walls of the head portion 112 such that the cat attractant vapor can be released through the remaining portion of the head portion 112.

FIGS. 2A-2G illustrate a stuffed toy 200 according to exemplary embodiments of the present invention. Although in FIGS. 2A to 2G the stuffed toy 200 is configured to resemble a shark, it is understood that the stuffed toy 200 may also be configured to resemble other aquatic animals, for example a fish, a whale, a dolphin, a seahorse, etc., as desired.

The size of the stuffed toy 200 may be similar to the size of the stuffed toy 100 described above.

Referring to FIGS. 2A-2B, the stuffed toy 200 may include a body portion 214 and a head portion 212 connected to the body portion 212, eyes 224, teeth 250, a plurality of gill slits 254, a pair of pectoral fins 238, a first dorsal fin 228-1, a second dorsal fin 228-2, a caudal fin 252, feathers 236 disposed at the caudal fin 252, a cord 230 and a fish attachment 256.

As shown in FIGS. 2A-2C, the body portion 214 may be elongated, curved, and may become smaller toward the caudal fin 252 to mimic the body shape of a shark. As shown in FIGS. 2A-2C, the head portion 212 may also be curved, may have the teeth 250 disposed at a mouth region, and may be generally shaped to resemble the head of a shark.

A boundary between the body and head portions 214 and 212 may correspond to, for example, a location of the gill slits 254. The gill slits 254 may be, for example, stitching on both sides of the stuffed toy 200.

Referring to FIGS. 2A-2C, the body portion 214 includes an exterior 218, and the head portion 212 includes an exterior 220. The fabrics included in the exterior 218 may correspond to the fabrics of the exterior 118, and the fabrics included in the exterior 220 may correspond to the fabrics of the exterior 120. Thus, a detailed description thereof may be omitted for brevity purposes. In addition, it is understood that elements or components of the stuffed toy 200 not described in detail may be assumed to be similar to corresponding elements or components described in other parts of the specification.

The exterior 218 and the exterior 220 may include the same fabric material. As shown in FIGS. 2A-2B, a fabric material may extend continuously between the exterior 218 and the exterior 220 without a seam where the head and body portions 212 and 214 connect to each other. Alternatively, the head and body portions 212 and 214 may be seamed together as described with reference to the stuffed toy 100 (e.g., the seam 122). In this case, the seam may be located, for example, where the gill slits 254 are located. In addition, or alternatively, as shown in FIGS. 2A-2B, a plurality of fabric panels may be joined together along longitudinal seams to form the stuffed toy 200.

Each of the pectoral fins 238 may include a sheet, film or fabric made at least partially of cellophane, high-density polyethylene (HDPE), or other material configured to create crinkle-like sounds when manipulated and a pair of exterior fabric panels covering the material configured to create crinkle-like sounds. The exterior fabric panels of the pectoral fins 238 may include the same fabric material as the exteriors 218 and 220.

The first and second dorsal fins 228-1 and 228-2 and the caudal fin 252 may include the same materials and decorative patterns described with reference to the wings 138 above to attract a cat and to encourage and/or extend an interaction between the cat and the stuffed toy 200. It is understood that the materials and decorative patters included in the first and second dorsal fins 228-1 and 228-2 and the caudal fin 252 may differ from those of the wings 138 as long as they make crinkle-like sounds and/or have shiny and/or sparkling decorations to attract a cat.

The feathers 236 may be genuine feathers. The feathers 236 may all have the same color as each other or may have different colors. Referring to FIGS. 2A-2B, the eyes 224 may be stitched on the head portion 212 (although only one eye 224 is shown in the drawings). The teeth 250 may be made of felt material and may be attached at a front end of the stuffed toy 200, as shown in FIGS. 2A-2B. The fish attachment 256 may be made of flexible fabric, for example, felt, and may be disposed at or near the head portion 212 or on the body portion 214 to further stimulate the cat to play or during play, as shown in FIGS. 2A-2B. Referring to FIGS. 2A-2B, the cord 230 may be disposed at a vicinity of the fish attachment 256. It is understood that additional decorative attachments may be disposed on the exteriors 218 and 220 of the stuffed toy 200.

Thus, the stuffed toy 200 is visually pleasing and may attract a cat into playing with the stuffed toy 200 and/or its owner, thus promoting interaction between the cat and its owner.

Referring to FIGS. 2C-2F, the stuffed toy 200 may define an interior space 216. The interior space 216 may include a container 240, cat attractant(s) and filler material 248. As shown in FIGS. 2C-2F, the container 240 may extend at least partially along a portion of the interior space 216 corresponding to the body portion 214. The container 240 may be made of the same materials as the container 140.

The container 240 acts as a vapor barrier, and may be stitched or laminated to the body portion 214 and/or the head portion 212 at the interior space 216.

The container 240 may be at least partially filled with one or more cat attractants as shown in FIG. 2C. As shown in FIGS. 2C, 2E and 2F, the container 240 may include catnip 242 and silver vine 244. The silver vine 244 may be retained in permeable containers 246. Alternatively, or in addition, the container 240 may include valerian root, tatarian honeysuckle, and/or other cat attractants.

When the container 240 is not fully filled with cat attractants, the remaining space inside the container 240 may be filled with the filler material 248, as indicated in FIG. 2C. The filler material 248 may be illustrated as stippling in FIGS. 2C-2F. In addition, the remainder of the interior space 216 may be filled with the filler material 248 as shown in FIG. 2C.

As shown in FIGS. 2C-2F, the container 240 may be open at or near the head portion 212 such that the aroma released by the cat attractant material (e.g., the catnip 242 silver vine 244, the valerian root, the tatarian honeysuckle, etc., that may be included in the container 240) is greater at the head portion 212 than at the body portion 214.

For example, the opening of the container 240 may correspond to the location of the gill slits 254, or may be slightly forwardly or slightly rearwardly of the gill slits 254 within the interior space 216.

Accordingly, the aroma of the cat attractant material disposed in the container 240 may be released mainly in through the head portion 212 of the stuffed toy 200.

Further, as shown in FIGS. 2C-2D, additional cat attractant material, for example, silver vine 244 may be disposed outside of the container 240 in a location of the interior space 216 corresponding to the head portion 212. Alternatively, or in addition to the silver vine 244, catnip 242, valerian root, tatarian honeysuckle, and the like, may be disposed at the location of the interior space 216 corresponding to the head portion 212 to further attract a cat and to induce it to play or exhibit certain behavior when sniffing the head portion 212. Thus, the efficacy of the mind-altering effect of the stuffed toy 200 on the pet is high.

However, although not shown in the drawings, the cat attractant material disposed outside of the container 240 may be omitted without affecting the efficacy of the stuffed toy 200 due to the cat attractant(s) disposed in the container 240.

Thus, the stuffed toy 200 may stimulate the cat into playful behavior, into hugging the stuffed toy 200, etc., to provide a pleasing viewing and interactive experience for the pet owner and the pet.

In addition, a cat is likely to hug the toy with the cat's head being adjacent to the head portion 212 so that the cat can smell the cat attractant material disposed inside of the stuffed toy 200 and the cat's body may be adjacent to the body portion 214. This may provide a pleasing view to the pet's owner.

The exteriors 218 and 220 may be decorated with color to attract a cat and/or according to a pet owner's taste.

Thus, the stuffed toy 200 of the invention may provide pet owners with a clean, safe and effective toy. Since the cat attractant material is disposed inside of the stuffed toy 200, its aroma will be preserved for a long period of time, thus extending the longevity of the behavior-altering effect of the stuffed toy 200.

Similarly to the description above with reference to the stuffed toy 100, with reference to FIG. 2G, the container 240 of the stuffed toy 200 may also not extend all the way to the tail end of the toy 200. In addition, as shown in FIG. 2G, the container 240 may also have two or more openings (e.g., one opening closer to the head portion 212 and one opening closer to the tail end of the toy 200), as described above for the stuffed toy 100, such that the aroma released by the cat attractant material (e.g., the catnip 242 silver vine 244, the valerian root, the tatarian honeysuckle, etc., that may be included in the container 240) is greater at the head portion 212 than at the body portion 214.

In an embodiment, as shown in FIG. 2G, the toy 200 includes a mixture of catnip 242 and silver vine 244 disposed on at least one location along the interior space 216, as described above with reference to the toy 100. The mixture of catnip 242 and silver vine 244 may be the same as that described with reference to the toy 100, and the location(s) where the mixture of catnip 242 and silver vine 244 is disposed within the interior space 216 may be the same as that described with reference to the toy 100. For example, as shown in FIG. 2G, the toy 200 includes a mixture of catnip 242 and silver vine 244 disposed in the container 240, and a mixture of catnip 242 and silver vine 244 disposed outside of the container 240, for example, inside of the head portion 212.

Although not shown in FIGS. 2A-2F, in an embodiment, the container 240 may be disposed entirely inside of the head portion 212, or a major portion of the container 240 may extend inside of the head portion 212. In this case, the opening of the container 240 may be included in a part of the interior space 216 corresponding to the head portion 212, or in a part of the interior space 216 corresponding to the body portion 214 but in a vicinity of the head portion 212. In this embodiment, the exterior 218 may be made of a non-permeable or slightly permeable fabric material, sheet material or film, and/or the interior surface/walls of the body portion 214 may be lined with a non-permeable or slightly permeable fabric material, sheet material or film such that the vapor of the cat attractant material inside of the stuffed toy 200 is released mainly though the head portion 212. In this case, the container 240 may be sewn to or laminated on a portion of the interior surface/walls of the head portion 212 such that the cat attractant vapor can be released through the remaining portion of the head portion 212.

FIGS. 3A-3F illustrate a stuffed toy 300 according to an exemplary embodiment of the present invention. The stuffed toy 300 is configured to resemble a seahorse, or a unicorn. It is understood that the stuffed toy 300 can also be configured to resemble other mythical creatures or animals.

The size of the stuffed toy 300 may be similar to the size of the stuffed toys 100 and 200 described above.

Figure 3A:
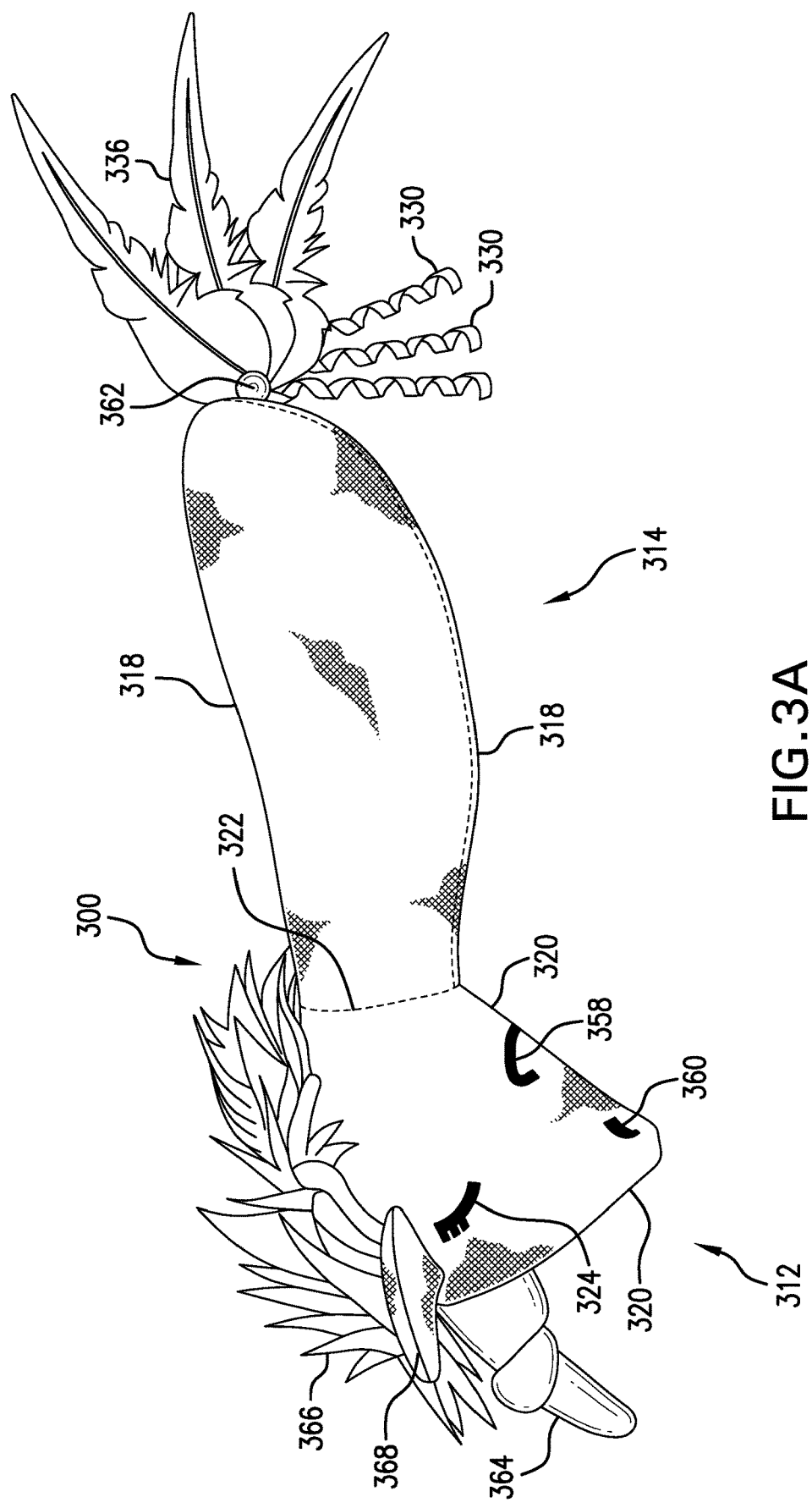
FIG. 3A is a perspective view illustrating a stuffed toy according to an exemplary embodiment of the present invention.
Figure 3B:
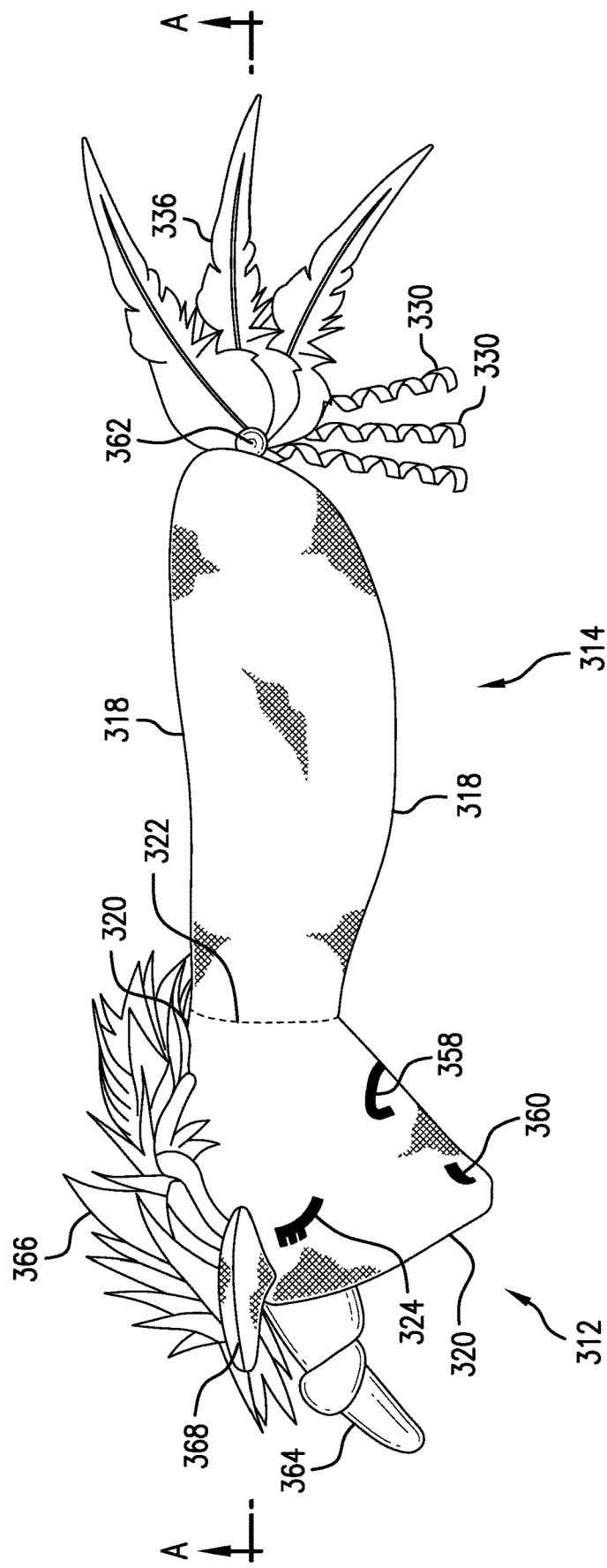
FIG. 3B is a side elevational view illustrating a side of the stuffed toy of FIG. 3A according to an exemplary embodiment of the present invention.

Referring to FIGS. 3A-3B, the stuffed toy 300 may include a body portion 314 and a head portion 312 connected to the body portion 314, a horn 364, a mane 366, eyes 324, a mouth 358, a nose 360, ears 368 and a plurality of decorative attachments.

Referring to FIGS. 3A-3B, the decorative attachments may include, a bell 362, feathers 336, a plurality of cords 330, etc. The bell 362, the feathers 336, the plurality of cords 330 are exemplarily shown as being attached to a tail end of an exterior of the stuffed toy 300. However, the present invention is not limited thereto. The bell 362, the feathers 336, the plurality of cords 330 and other decorative attachments may also be disposed at other parts of the exterior of the stuffed toy 300 and need not be clustered together. In addition, the stuffed toy 300 need not have all of the aforementioned decorative attachments.

Figure 3C:
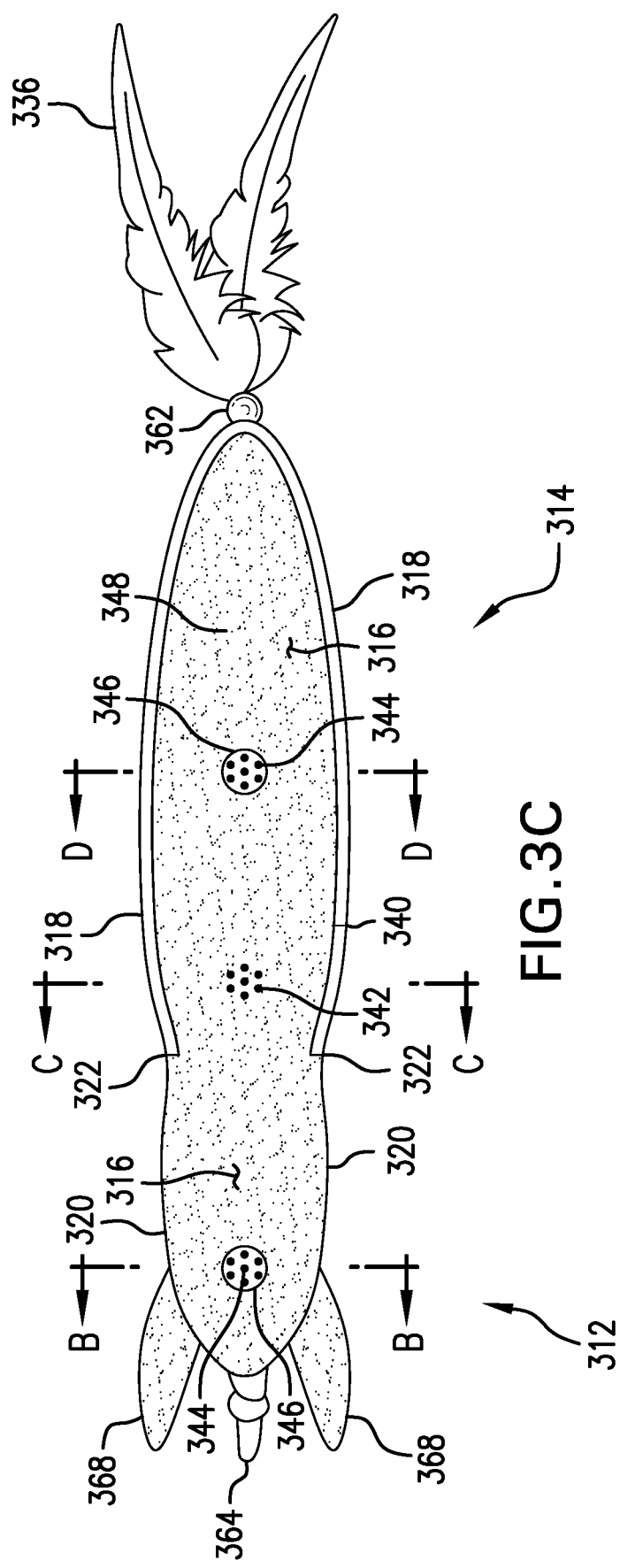
FIG. 3C is a cross-sectional view taken along line A-A of FIG. 3B.

Referring to FIGS. 3A-3B, the body portion 214 may be elongated and may be curved to resemble the body of a seahorse. For example, the body portion 214 may have a spiral shape, or an S-shape as shown in FIGS. 3A-3B, and may have generally elliptic cross-sections as shown in FIGS. 3E and 3F. However, the body portion 214 may also have round, oval, or other cross-sectional shapes, or cross-sections having curved portions or a combination of curved and flat portions.

Figure 3D:
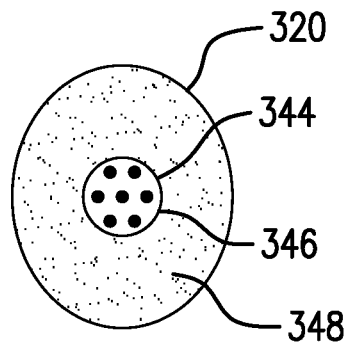
FIG. 3D is a cross-sectional view taken along line B-B of FIG. 3C.
Figure 3E:
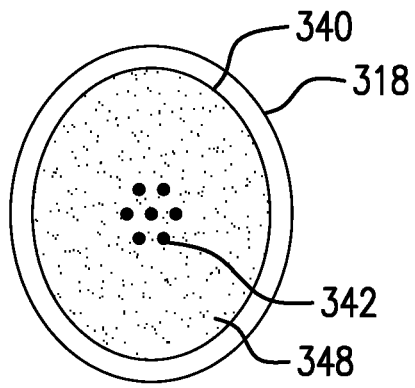
FIG. 3E is a cross-sectional view taken along line C-C of FIG. 3C.
Figure 3F:
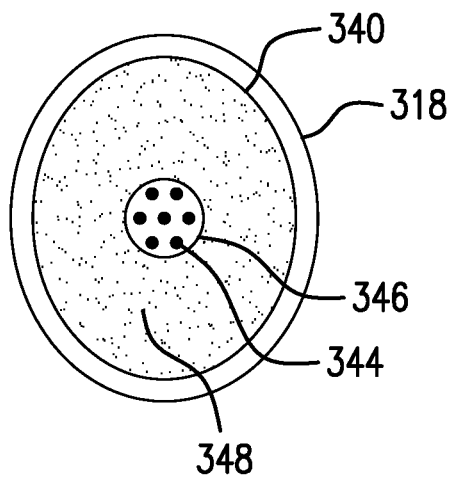
FIG. 3F is a cross-sectional view taken along line D-D of FIG. 3C.

Referring to FIGS. 3A-3B, the head portion 312 may have a V-like profile and may have a generally rounded cross-section as shown in FIG. 3D. However, the shape of the head portion 312 is not limited thereto, and may have other different shapes which resemble a seahorse or unicorn.

Referring again to FIGS. 3A-3B, the head portion 312 may include the horn 364 for decorative purposes and to attract a cat into play. The horn 364 may be straight or may extend in a spiral fashion. In addition, the horn 364 may be covered with a plurality of light-refracting dots that refract light to cause the horn 364 to appear as reflecting light of various colors to attract a cat and to project an aesthetically pleasing image. Alternatively, or in addition, the horn 364 may have reflective, shiny and/or sparkling decorative dots/material attached thereon. It is understood that the horn 364 may also be manufactured without light-refracting or reflecting material on its external surface.

Referring to FIGS. 3A-3B, the mane 366 may include soft fabric fibers, for example, plant-based on synthetic hair-like fibers. The mane 366 may be colored to have, for example, a rainbow pattern, a single color, or a combination of colors as desired to attract a cat and to please the pet owner.

Referring to FIGS. 3A-3C, the body portion 314 includes an exterior 318, and the head portion 312 includes an exterior 320. The fabrics included in the exterior 318 may correspond to the fabrics of the exteriors 218 and 118, and the fabrics included in the exterior 320 may correspond to the fabrics of the exteriors 220 and 120. Thus, a detailed description thereof may be omitted for brevity purposes. In addition, it is understood that elements or components of the stuffed toy 300 not described in detail may be assumed to be similar to corresponding elements or components described in the specification.

The exterior 318 and the exterior 320 may include the same fabric material. As shown in FIGS. 3A-3B, the exterior 318 and the exterior 320 may be joined together by a seam 322. However, the present invention is not limited thereto. For example, the head and body portions 312 and 314 may also be formed of a continuous fabric material. In other words, the seam 322 between the head and body portions 312 and 314 may be omitted.

The body and head portions 314 and 312 may meet, for example, at the location of the seam 322.

The feathers 336 may be genuine feathers. The feathers 336 may all have the same color as each other or may have different colors. Referring to FIGS. 3A-3B, the eyes 324 may be stitched on the head portion 312. Thus, the stuffed toy 300 has a visually pleasing appearance and may attract a cat into playing with the stuffed toy 300 and/or its owner, thus promoting interaction between the cat and its owner.

Referring to FIGS. 3C-3F, the stuffed toy 300 may include a container 340 disposed in an interior space 316 of the stuffed toy 300. The container 340 may include cat attractant material therein. A portion of the container 340 not occupied by the cat attractant(s) may be filled with a filler material 348, as shown in FIG. 1C. The filler material 348 is shown by stippling in FIGS. 3C-3F. In addition, the filler material 348 may be disposed outside of the container 340 to fill the remainder interior space 316 as shown in FIG. 1C.

As shown in FIGS. 3C-3F, the container 340 may extend at least partially along a portion of the interior space 316 corresponding to the body portion 314. In an embodiment, as shown in FIG. 3C, the container 340 extends along the entire length of the interior space 316 corresponding to the body portion 314. The container 340 may be made of the same material(s) as the containers 240 and 140.

The container 340 acts as a vapor barrier and may be stitched to the body portion 314 and/or the head portion 312 at the interior space 316. Alternatively, or in addition, the container 340 may be laminated on the body portion 314 and/or the head portion 312 at the interior space 316.

The container 340 may be at least partially filled with one or more cat attractants, as shown in FIG. 3C. As shown in FIGS. 3C, 3E and 3F, the container 340 may include catnip 342 and silver vine 344. The silver vine 344 may be retained in permeable containers 346. Alternatively, or in addition, the container 340 may include valerian root, tatarian honeysuckle, and other cat attractant material.

As shown in FIGS. 3C-3F, the container 340 is open adjacent to the seam 322 such that the aroma released by the cat attractant material (e.g., the catnip 342 silver vine 344, the valerian root, the tatarian honeysuckle, etc., that may be included in the container 340) is greater at the head portion 312 than at the body portion 314.

Alternatively, although not shown in the drawings, the opening of the container 340 may have an opening slightly forwardly of where the head and body portions 312 and 314 meet (e.g., the location of the seam 322), or slightly rearwardly of where the head and body portions 312 and 314 meet.

Accordingly, the aroma released by the cat attractant material (e.g., the catnip 342 silver vine 344, the valerian root, the tatarian honeysuckle, etc., that may be included in the container 340) is greater at the head portion 312 than at the body portion 314.

Further, as shown in FIGS. 3C-3D, additional cat attractant material, for example, silver vine 344 may be disposed outside of the container 340 in a location of the interior space 316 corresponding to the head portion 312. Alternatively, or in addition to the silver vine 344, catnip 342, valerian root, tatarian honeysuckle, and the like, may be disposed at the location of the interior space 316 corresponding to the head portion 312 to further attract the cat and to induce it to play or exhibit certain behavior. Thus, the efficacy of the mind-altering effect of the stuffed toy 300 on the pet is high.

Although not shown in the drawings, the cat attractant material disposed outside of the container 340 may also be omitted without affecting the efficacy of the stuffed toy 300 due to the cat attractants disposed in the container 340.

As described with reference to the stuffed toys 100 and 200, the container 340 of the stuffed toy 300 may also not extend all the way to the tail end of the toy 300. In addition, the container 340 may also have two or more openings as described above for the stuffed toys 100 and 200, such that the aroma released by the cat attractant material (e.g., the catnip 342 silver vine 344, the valerian root, the tatarian honeysuckle, etc., that may be included in the container 340) is greater at the head portion 312 than at the body portion 314.

In an embodiment, and although not shown in the figures, the toy 300 includes a mixture of catnip 342 and silver vine 344 disposed on at least one location along the interior space 316, as described above with reference to the toys 100 and 200. The mixture of catnip 342 and silver vine 344 may be the same as that described with reference to the toys 100 and 200, and the location(s) where the mixture of catnip 342 and silver vine 344 is disposed within the interior space 316 may be the same as that described with reference to the toys 100 and 200.

In an embodiment, although not shown in FIGS. 3A-3F, the container 340 may be disposed entirely inside of the head portion 312, or a major portion of the container 340 may extend inside of the head portion 312. In this case, the opening of the container 340 may be included in a part of the interior space 316 corresponding to the head portion 312, or in a part of the interior space 316 corresponding to the body portion 314 but in a vicinity of the head portion 312. In this embodiment, the exterior 318 may be made of a non-permeable or slightly permeable fabric material, sheet material or film and/or the interior surface/walls of the body portion 314, and/or may be lined with a non-permeable or slightly permeable fabric material, sheet material or film such that the vapor of the cat attractant material inside of the stuffed toy 300 is released mainly though the head portion 312. In this case, the container 340 may be sewn or laminated to the head portion 312.

Thus, the stuffed toy 300 may stimulate the cat into playful behavior, into hugging the stuffed toy 300, etc. to provide a pleasing viewing and interactive experience for the pet owner and the pet.

In addition, the exteriors 318 and 320 may be colored and decorated to attract a cat.

Accordingly, a stuffed toy according to the present invention may contribute to an increased level of interaction between a cat and its owner due to the toy's visceral effects on the cat. The toy has a size and shape appropriate for a cat to hug it, and is configured to release the cat attractant aroma through its head so that the cat can approach the head of the toy and to hug the toy in a way that the cat faces the toy's head. This may provide a satisfying view to the cat owner. The toy is safe for use since the cat attractant material(s) is disposed inside of it such that it cannot be ingested by the cat. In addition, the toy of the present invention can be freely used without the worry of having to clean up spilled cat attractant material since the cat attractant material is enclosed inside of the toy.

While the present invention has been particularly shown and described with reference to exemplary embodiments thereof, it will be apparent to those of ordinary skill in the art that various changes in form and detail may be made therein without departing from the spirit and scope of the present invention.

What is claimed is:

1. A stuffed toy, comprising:
   a body and a head connected to the body, the body and the head together defining an internal space and forming an exterior of the stuffed toy; and
   a container at least partially filled with a cat attractant material which emits an aroma, wherein the container is irremovably disposed within the internal space of the stuffed toy,
   wherein the container includes a first opening located in a portion of the internal space corresponding to the head, in a portion of the internal space corresponding to a boundary between the body and the head, or in a portion of the internal space corresponding to the body but at a vicinity of the head,
   wherein the first opening of the container is configured to remain open within the internal space of the stuffed toy, and the exterior of the stuffed toy is at least partially permeable to air such that the aroma emitted from the cat attractant material is greater at the head of the stuffed toy as compared to along the body.

2. The stuffed toy of claim 1, wherein the container is non-permeable.

3. The stuffed toy of claim 1, wherein the container has a low permeability.

4. The stuffed toy of claim 1, wherein the container includes a material which produces a crinkle sound when manipulated.

5. The stuffed toy of claim 1, wherein the container is laminated or stitched to the body.

6. The stuffed toy of claim 1, wherein the container is at least partially made of cellophane, polyester film, polypropylene or nylon.

7. The stuffed toy of claim 1, wherein the container extends at least partially in the portion of the internal space corresponding to the body.

8. The stuffed toy of claim 1, wherein the container extends at least partially in the portion of the internal space corresponding to the head.

9. The stuffed toy of claim 1, wherein the cat attractant material includes catnip, silver vine, valerian root or tatarian honeysuckle.

10. The stuffed toy of claim 1, wherein the cat attractant includes a mixture of catnip and silver vine.

11. The stuffed toy of claim 1, further comprising cat attractant material disposed outside of the container but within the internal space, the cat attractant material disposed outside of the container including at least one of catnip, silver vine, valerian root and tatarian honeysuckle.

12. The stuffed toy of claim 11, wherein the cat attractant material that is disposed outside of the container is located in the portion of the internal space corresponding to the head.

13. The stuffed toy of claim 1, wherein the container further includes a second opening disposed between the first opening and a tail end of the toy,
   wherein the second opening is configured to remain open within the internal space of the stuffed toy.

14. The stuffed toy of claim 1, wherein the head has an outside surface that is decorated to appear like the head of an animal.

15. The stuffed toy of claim 1, wherein the exterior of the stuffed toy is made of a canvas material.

16. The stuffed toy of claim 1, further comprising feathers or cords attached to the exterior of the stuffed toy.

17. A stuffed toy, comprising:
   an elongated body and a head attached to the body, the body and the head defining an interior space and an exterior surface resembling an animal or a fictional creature;
   a container including a cat attractant material therein, wherein the container is irremovably disposed in the interior space and extends at least partially along a portion of the interior space corresponding to the body,
   wherein the container has an opening in a portion of the interior space corresponding to the head, in a portion of the interior space where the head and the body are attached to one another, or in a portion of the interior space corresponding to the body but at a vicinity of the head,
   wherein the opening of the container is configured to remain open within the interior space of the stuffed toy, and
   wherein the exterior surface is at least partially permeable to air such that an aroma released by the cat attractant material is greater at the head than at the body; and
   filler material filling at least a portion of the interior space.

18. The stuffed toy of claim 17, wherein the container is at least partially made of cellophane and the cat attractant material includes at least one of catnip, silver vine, valerian root and tatarian honeysuckle.

19. The stuffed toy of claim 17, wherein the exterior surface resembles a seahorse.

20. The stuffed toy of claim 17, wherein the exterior surface resembles a bird.

21. The stuffed toy of claim 1, wherein the first opening is disposed in the portion of the internal space corresponding to the head.

22. The stuffed toy of claim 1, wherein the first opening is disposed in the portion of the internal space corresponding to the boundary between the body and the head.

* * * * *